(12) United States Patent
Kovalets et al.

(10) Patent No.: US 11,868,899 B2
(45) Date of Patent: Jan. 9, 2024

(54) SYSTEM AND METHOD FOR MODEL CONFIGURATION SELECTION PRELIMINARY CLASS

(71) Applicant: Saferide Technologies Ltd., Herzliya (IL)

(72) Inventors: Sofiia Kovalets, Kyiv (UA); Stanislav Barabanov, Ramat Gan (IL); Yuval Shalev, Kfar-Saba (IL); Alexander Apartsin, Rehovot (IL)

(73) Assignee: Saferide Technologies Ltd., Herzliya (IL)

( * ) Notice: Subject to any disclaimer, the term of this patent is extended or adjusted under 35 U.S.C. 154(b) by 0 days.

(21) Appl. No.: 18/174,657

(22) Filed: Feb. 27, 2023

(65) Prior Publication Data

US 2023/0274152 A1 Aug. 31, 2023

(30) Foreign Application Priority Data

Feb. 28, 2022 (IL) .......................................... 290977

(51) Int. Cl.
*G06N 3/088* (2023.01)
*G06N 3/0985* (2023.01)

(52) U.S. Cl.
CPC ........... *G06N 3/088* (2013.01); *G06N 3/0985* (2023.01)

(58) Field of Classification Search
CPC .... G06N 3/088; G06N 3/0895; G06N 3/0985; G06N 20/00
See application file for complete search history.

(56) References Cited

U.S. PATENT DOCUMENTS

| 2016/0253445 A1* | 9/2016 | Pataky | ................... G06F 30/327 716/104 |
| 2019/0384273 A1 | 12/2019 | Han | |

(Continued)

OTHER PUBLICATIONS

Karoly et al., "Unsupervised Clustering for Deep Learning: A tutorial survey," Acta Polytechnica Hungarica vol. 15, No. 8, 2018 (Year: 2018).*

(Continued)

*Primary Examiner* — Miranda M Huang
*Assistant Examiner* — Yao David Huang

(57) ABSTRACT

A model configuration selection system, the model configuration selection system comprising a processing circuitry configured to: (A) obtain: (a) one or more model configurations, each model configuration includes a set of parameters utilized to generate respective models, and (b) a training data-set comprising a plurality of unlabeled records, each unlabeled record including a collection of features describing a given state of a physical entity; (B) cluster the training data-set into two or more training data-set clusters using a clustering algorithm; (C) label (a) the unlabeled records of a subset of the training data-set clusters with a synthetic normal label, giving rise to a normal training data-set, and (b) the unlabeled records of the training data-set clusters not included in the subset with a synthetic abnormal label; (D) train, for each model configuration, using the normal training data-set, a corresponding model utilizing the corresponding set of parameters, each model capable of receiving the unlabeled records, and determining, for each of the unlabeled records, a corresponding normal label or abnormal label, wherein the normal label being indicative of conformity of the respective unlabeled record with an allowed state of the physical entity and the abnormal label being indicative of conformity of the respective unlabeled record with a disallowed state of the physical entity;

(Continued)

(E) determine, for each model, a score, associated with an ability of the corresponding model to determine labels to the unlabeled records of the training data-set in accordance with the synthetic normal labels and with the synthetic abnormal labels; and (F) perform an action, based on the scores.

18 Claims, 3 Drawing Sheets

(56) References Cited

U.S. PATENT DOCUMENTS

| | | | |
|---|---|---|---|
| 2020/0005096 A1 | 1/2020 | Calmon et al. | |
| 2020/0125897 A1 | 4/2020 | Wang et al. | |
| 2020/0175354 A1 | 6/2020 | Volodarskiy et al. | |
| 2020/0311572 A1 | 10/2020 | Baker | |
| 2020/0327369 A1* | 10/2020 | Cruz | G07C 5/0816 |
| 2021/0042590 A1 | 2/2021 | Watts | |
| 2021/0150412 A1* | 5/2021 | Rashidi | G06N 20/00 |
| 2021/0158085 A1 | 5/2021 | Budzik | |
| 2021/0216813 A1 | 7/2021 | Pouyan et al. | |
| 2021/0295107 A1* | 9/2021 | Krishna | G06N 7/01 |
| 2022/0398460 A1* | 12/2022 | Dalli | G06F 18/217 |

OTHER PUBLICATIONS

Baek et al., "Clustering-based label estimation for network anomaly detection," Digital Communications and Networks 7 (2021) 37-44 (Year: 2021).*
Mahon et al., "Selective Pseudo-Label Clustering," KI 2021, LNAI 12873, pp. 158-178, 2021 (Year: 2021).*
Ranking and automatic selection of machinelearning models Abstract (Retrieved on Jun. 7, 2022) ). Retrieved from the Internet: <https://www.tdcommons.org/cgi/viewcontent.cgi?article=2040&context=dpubs_series> A Whole Document.
K. Hsu et al: "Unsupervised learning via meta-learning",arxiv.org, Cornell University Library, 201 Olin Library Cornell University Ithaca, NY 14853,Mar. 21, 2019 (Mar. 21, 2019), XP081123292, DOI: 10.48550/arXiv.1810.02334 * 2 and 4, as well as corresponding appendices *.
M. Q. Ma et al: "A large-scale study on unsupervised outlier model selection: evaluating the internal model evaluation strategies", ARXIV:2104.01422V2, Apr. 12, 2021 (Apr. 12, 2021), XP081932019, DOI: 10.48550/arXiv.2104.01422. * sections 2, 3 and 5 *.
M. Kotlar et al: "Novel meta-features for 1-15; automated machine learning model selection in anomaly detection", IEEE Access, vol. 9, Jun. 21, 2021 (Jun. 21, 2021), pp. 89675-89687, XP011862900, DOI: 10.1109/ACCESS.2021.3090936. * sections III-VI *.
Y. Zhao et al: "Automatic unsupervised outlier model selection", Advances in Neural Information Processing Systems, vol. 34, Dec. 6, 2021 (Dec. 6, 2021), pp. 4489-4502, XP093053282, ISBN: 9781713845393; * sections 3 and 4.
EESR; Jun. 26, 2023; European Patent Office.

* cited by examiner

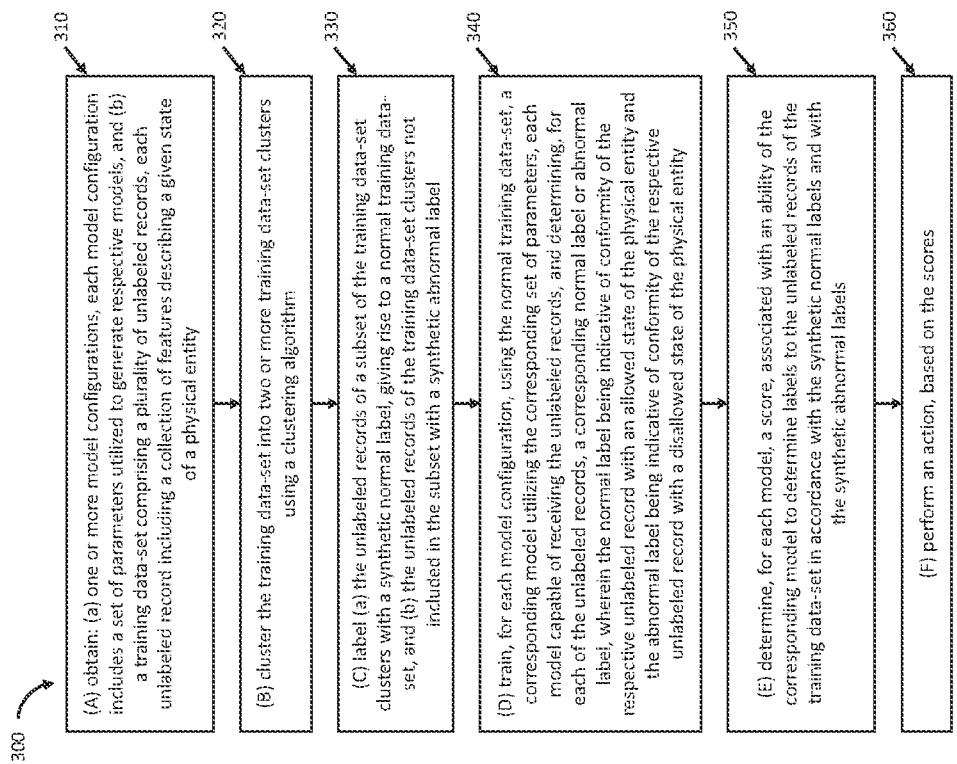

SYSTEM AND METHOD FOR MODEL CONFIGURATION SELECTION PRELIMINARY CLASS

TECHNICAL FIELD

The invention relates to a system and method for model configuration selection.

BACKGROUND

Models, and specifically Machine Learning (ML) models, can be used for a variety of tasks, such as: anomaly detection, prediction, face recognition and more. Models can be built utilizing algorithms. For example: ML algorithms are utilized to generate an ML model based on training data, in order to make detections or predictions without being explicitly programmed to do so. The ML algorithms can be supervised algorithms (such as: decision trees, random forest, linear regression, naive bayes, Artificial Neural Networks (ANN), logistic regression, etc.) or unsupervised algorithms (such as: classification, clustering, k-means, feature selection, reinforcement learning, etc.). Different models can be generated using different model configurations—either by utilizing a different algorithm for each model generated or by using a given algorithm with different parameters for each model generated.

A model configuration includes a set of parameters utilized to generate the respective models. The model configuration's parameters can include: type of algorithm used to generate the respective models (such as: neural network, random forest, k-means, etc.), number of layers, depth of the tree, etc. Currently there are no solutions for evaluating and ranking multiple model configurations as suitable for generating models that can achieve a given task.

Models, and specifically ML models (such as: anomaly detection models), that are under development lack an evaluation framework that can provide automated feedback on the usability of the developed model to perform the task it is trained for. Such a framework obtains a plurality of models, each generated utilizing a different model configuration, and provides model ranking, hyper-parameter tuning and model explainability validation for the plurality of model configurations.

The evaluation framework can be used, for example, for evaluating a plurality of anomaly detection models, each generated utilizing a different model configuration. These anomaly detection models can be used in different domains, for example: e-commerce, fraud detection, Vehicle Health Monitoring (VHM), etc.

In some cases, the evaluation framework can utilize Automatic ML (AutoML) to proactively change the obtained model configurations used to generate the models. The proactively changed model configurations are than used to generate new models, which can be evaluated together with the previously generated models, thus providing performance feedback as part of an automatic training procedure. The evaluation framework can utilize both supervised and unsupervised ML algorithms to evaluate the model configurations.

Such an evaluation framework can also be used to demonstrate capabilities of models that are under development.

Currently there are no such evaluation frameworks that can automatically and in some cases in an unsupervised way, select, without the availability of true labels, between model configurations by evaluating the suitability of a plurality of models, each generated utilizing a different model configuration, to perform a specific task, for example: an anomaly detection task. There is thus a need in the art for a new system and method for model configuration selection.

General Description

In accordance with a first aspect of the presently disclosed subject matter, there is provided a model configuration selection system, the model configuration selection system comprising a processing circuitry configured to: (A) obtain: (a) one or more model configurations, each model configuration includes a set of parameters utilized to generate respective models, and (b) a training data-set comprising a plurality of unlabeled records, each unlabeled record including a collection of features describing a given state of a physical entity; (B) cluster the training data-set into two or more training data-set clusters using a clustering algorithm; (C) label (a) the unlabeled records of a subset of the training data-set clusters with a synthetic normal label, giving rise to a normal training data-set, and (b) the unlabeled records of the training data-set clusters not included in the subset with a synthetic abnormal label; (D) train, for each model configuration, using the normal training data-set, a corresponding model utilizing the corresponding set of parameters, each model capable of receiving the unlabeled records, and determining, for each of the unlabeled records, a corresponding normal label or abnormal label, wherein the normal label being indicative of conformity of the respective unlabeled record with an allowed state of the physical entity and the abnormal label being indicative of conformity of the respective unlabeled record with a disallowed state of the physical entity; (E) determine, for each model, a score, associated with an ability of the corresponding model to determine labels to the unlabeled records of the training data-set in accordance with the synthetic normal labels and with the synthetic abnormal labels; and (F) perform an action, based on the scores.

In some cases, the action is one or more of: (a) determine, for each of the model configurations, if a first overall score calculated for a corresponding model configuration, based on the scores of the respective model is above a first threshold, (b) rank the model configurations based on the scores of the corresponding models, or (c) upon a second overall score calculated for a corresponding model configuration, based on the scores of the respective model is a below a second threshold, change the model configuration of the respective model by changing at least one parameter of the set of parameters, and repeat steps (D) to (F) until the second overall score is equal or above the second threshold.

In some cases, the processing circuitry is further configured to reduce a dimension of the training data-set before clustering the training data-set into two or more training data-set clusters.

In some cases, the processing circuitry is further configured to: label, each of the training data-set clusters with a synthetic unique cluster label, giving raise to uniquely labeled training data-set clusters; train, utilizing the uniquely labeled training data-set clusters, a classifier model, capable of receiving the unlabeled records, and determining, for each of the unlabeled records, a corresponding synthetic unique cluster label; determine, for each model, an explainability score, associated with a similarity between a first explanation of a first output of the model on the unlabeled records of the training data-set and a second explanation of a second output of the classifier model on the unlabeled records of the training data-set; and wherein the score of each model is based also on the corresponding explainability score.

In some cases, the model is a Machine Learning model.

In some cases, the training data-set clusters are distinct.

In some cases, the clustering algorithm is one or more of the following: dbscan, k-means, or constrained k-means.

In some cases, the subset of the training data-set clusters is selected randomly.

In some cases, the model is one of: a change point detection model, or an anomaly detection model.

In some cases, the training data-set is one or more of: a static data-set, or a time-series data-set.

In some cases, the model configuration selection system is an unsupervised model configuration selection system.

In some cases, the physical entity is a vehicle.

In accordance with a second aspect of the presently disclosed subject matter, there is provided a method comprising: (A) obtaining, by a processing circuitry: (a) one or more model configurations, each model configuration includes a set of parameters utilized to generate respective models, and (b) a training data-set comprising a plurality of unlabeled records, each unlabeled record including a collection of features describing a given state of a physical entity; (B) clustering, by the processing circuitry, the training data-set into two or more training data-set clusters using a clustering algorithm; (C) labeling, by the processing circuitry, (a) the unlabeled records of a subset of the training data-set clusters with a synthetic normal label, giving rise to a normal training data-set, and (b) the unlabeled records of the training data-set clusters not included in the subset with a synthetic abnormal label; (D) training, by the processing circuitry, for each model configuration, using the normal training data-set, a corresponding model utilizing the corresponding set of parameters, each model capable of receiving the unlabeled records, and determining, for each of the unlabeled records, a corresponding normal label or abnormal label, wherein the normal label being indicative of conformity of the respective unlabeled record with an allowed state of the physical entity and the abnormal label being indicative of conformity of the respective unlabeled record with a disallowed state of the physical entity; (E) determining, by the processing circuitry, for each model, a score, associated with an ability of the corresponding model to determine labels to the unlabeled records of the training data-set in accordance with the synthetic normal labels and with the synthetic abnormal labels; and (F) performing, by the processing circuitry, an action, based on the scores.

In some cases, the action is one or more of: (a) determine, for each of the model configurations, if a first overall score calculated for a corresponding model configuration, based on the scores of the respective model is above a first threshold, (b) rank the model configurations based on the scores of the corresponding models, or (c) upon a second overall score calculated for a corresponding model configuration, based on the scores of the respective model is a below a second threshold, change the model configuration of the respective model by changing at least one parameter of the set of parameters, and repeat steps (D) to (F) until the second overall score is equal or above the second threshold.

In some cases, the method further comprising: reducing, by the processing circuitry, a dimension of the training data-set before clustering the training data-set into two or more training data-set clusters.

In some cases, the method further comprising: labeling, by the processing circuitry, each of the training data-set clusters with a synthetic unique cluster label, giving raise to uniquely labeled training data-set clusters; training, by the processing circuitry, utilizing the uniquely labeled training data-set clusters, a classifier model, capable of receiving the unlabeled records, and determining, for each of the unlabeled records, a corresponding synthetic unique cluster label; determining, by the processing circuitry, for each model, an explainability score, associated with a similarity between a first explanation of a first output of the model on the unlabeled records of the training data-set and a second explanation of a second output of the classifier model on the unlabeled records of the training data-set; and wherein the score of each model is based also on the corresponding explainability score.

In some cases, the model is a Machine Learning model.

In some cases, the training data-set clusters are distinct.

In some cases, the clustering algorithm is one or more of the following: dbscan, k-means, or constrained k-means.

In some cases, the subset of the training data-set clusters is selected randomly.

In some cases, the model is one of: a change point detection model, or an anomaly detection model.

In some cases, the training data-set is one or more of: a static data-set, or a time-series data-set.

In some cases, the model configuration selection system is an unsupervised model configuration selection system.

In some cases, the physical entity is a vehicle.

In accordance with a third aspect of the presently disclosed subject matter, there is provided a non-transitory computer readable storage medium having computer readable program code embodied therewith, the computer readable program code, executable by processing circuitry of a computer to perform a method comprising: (A) obtaining, by a processing circuitry: (a) one or more model configurations, each model configuration includes a set of parameters utilized to generate respective models, and (b) a training data-set comprising a plurality of unlabeled records, each unlabeled record including a collection of features describing a given state of a physical entity; (B) clustering, by the processing circuitry, the training data-set into two or more training data-set clusters using a clustering algorithm; (C) labeling, by the processing circuitry, (a) the unlabeled records of a subset of the training data-set clusters with a synthetic normal label, giving rise to a normal training data-set, and (b) the unlabeled records of the training data-set clusters not included in the subset with a synthetic abnormal label; (D) training, by the processing circuitry, for each model configuration, using the normal training data-set, a corresponding model utilizing the corresponding set of parameters, each model capable of receiving the unlabeled records, and determining, for each of the unlabeled records, a corresponding normal label or abnormal label, wherein the normal label being indicative of conformity of the respective unlabeled record with an allowed state of the physical entity and the abnormal label being indicative of conformity of the respective unlabeled record with a disallowed state of the physical entity; (E) determining, by the processing circuitry, for each model, a score, associated with an ability of the corresponding model to determine labels to the unlabeled records of the training data-set in accordance with the synthetic normal labels and with the synthetic abnormal labels; and (F) performing, by the processing circuitry, an action, based on the scores.

BRIEF DESCRIPTION OF THE DRAWINGS

In order to understand the presently disclosed subject matter and to see how it may be carried out in practice, the subject matter will now be described, by way of non-limiting examples only, with reference to the accompanying drawings, in which:

FIG. 3 is a flowchart illustrating one example of a sequence of operations carried out for a model configuration selection process, in accordance with the presently disclosed subject matter.

DETAILED DESCRIPTION

Figure 1:
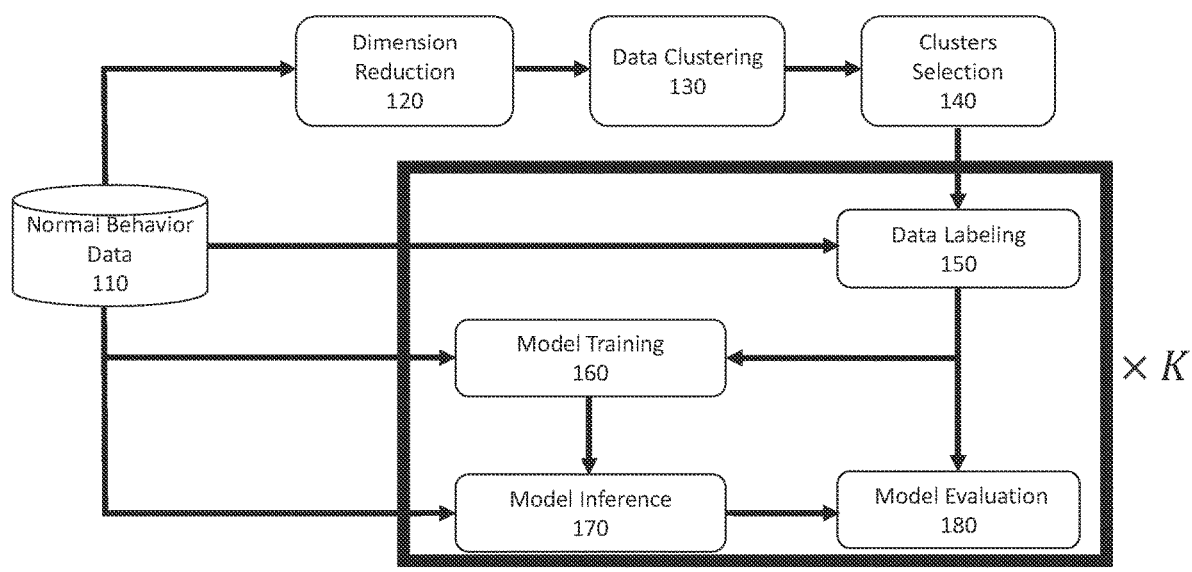
FIG. 1 is a schematic illustration of an exemplary evaluation framework for model configuration selection, in accordance with the presently disclosed subject matter.

In the following detailed description, numerous specific details are set forth in order to provide a thorough understanding of the presently disclosed subject matter. However, it will be understood by those skilled in the art that the presently disclosed subject matter may be practiced without these specific details. In other instances, well-known methods, procedures, and components have not been described in detail so as not to obscure the presently disclosed subject matter.

In the drawings and descriptions set forth, identical reference numerals indicate those components that are common to different embodiments or configurations.

Unless specifically stated otherwise, as apparent from the following discussions, it is appreciated that throughout the specification discussions utilizing terms such as "generating", "obtaining", "training", "identifying", "providing", "executing" or the like, include action and/or processes of a computer that manipulate and/or transform data into other data, said data represented as physical quantities, e.g., such as electronic quantities, and/or said data representing the physical objects. The terms "computer", "processor", "processing resource", "processing circuitry" and "controller" should be expansively construed to cover any kind of electronic device with data processing capabilities, including, by way of non-limiting example, a personal desktop/laptop computer, a server, a computing system, a communication device, a smartphone, a tablet computer, a smart television, a processor (e.g. digital signal processor (DSP), a microcontroller, a field programmable gate array (FPGA), an application specific integrated circuit (ASIC), etc.), a group of multiple physical machines sharing performance of various tasks, virtual servers co-residing on a single physical machine, any other electronic computing device, and/or any combination thereof.

The operations in accordance with the teachings herein may be performed by a computer specially constructed for the desired purposes or by a general-purpose computer specially configured for the desired purpose by a computer program stored in a non-transitory computer readable storage medium. The term "non-transitory" is used herein to exclude transitory, propagating signals, but to otherwise include any volatile or non-volatile computer memory technology suitable to the application.

As used herein, the phrase "for example," "such as", "for instance" and variants thereof describe non-limiting embodiments of the presently disclosed subject matter. Reference in the specification to "one case", "some cases", "other cases" or variants thereof means that a particular feature, structure or characteristic described in connection with the embodiment(s) is included in at least one embodiment of the presently disclosed subject matter. Thus, the appearance of the phrase "one case", "some cases", "other cases" or variants thereof does not necessarily refer to the same embodiment(s).

It is appreciated that, unless specifically stated otherwise, certain features of the presently disclosed subject matter, which are, for clarity, described in the context of separate embodiments, may also be provided in combination in a single embodiment. Conversely, various features of the presently disclosed subject matter, which are, for brevity, described in the context of a single embodiment, may also be provided separately or in any suitable sub-combination.

Figure 2:
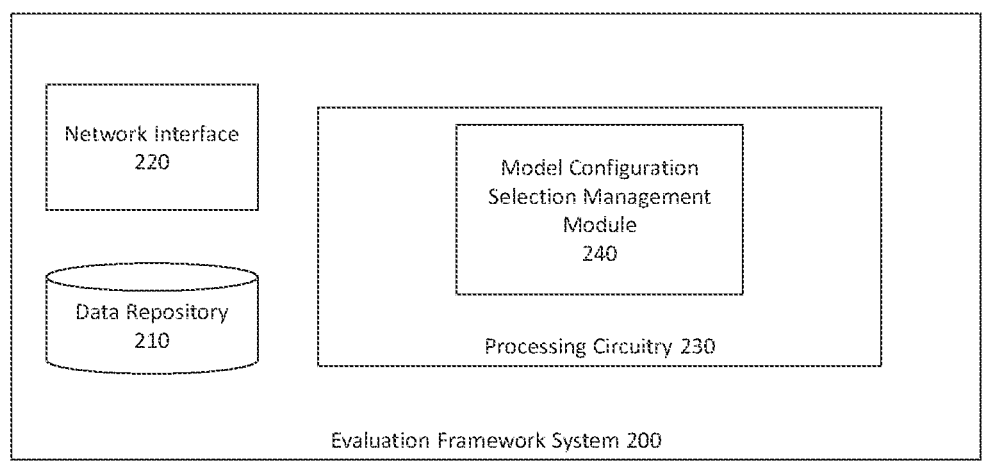
FIG. 2 is a block diagram schematically illustrating one example of a system for model configuration selection, in accordance with the presently disclosed subject matter.

In embodiments of the presently disclosed subject matter, fewer, more and/or different stages than those shown in FIG. 3 may be executed. In embodiments of the presently disclosed subject matter one or more stages illustrated in FIG. 3 may be executed in a different order and/or one or more groups of stages may be executed simultaneously. FIGS. 1-2 illustrate a general schematic of the system architecture in accordance with an embodiment of the presently disclosed subject matter. Each module in FIGS. 1-2 can be made up of any combination of software, hardware and/or firmware that performs the functions as defined and explained herein. The modules in FIGS. 1-2 may be centralized in one location or dispersed over more than one location. In other embodiments of the presently disclosed subject matter, the system may comprise fewer, more, and/or different modules than those shown in FIGS. 1-2.

Any reference in the specification to a method should be applied mutatis mutandis to a system capable of executing the method and should be applied mutatis mutandis to a non-transitory computer readable medium that stores instructions that once executed by a computer result in the execution of the method.

Any reference in the specification to a system should be applied mutatis mutandis to a method that may be executed by the system and should be applied mutatis mutandis to a non-transitory computer readable medium that stores instructions that may be executed by the system.

Any reference in the specification to a non-transitory computer readable medium should be applied mutatis mutandis to a system capable of executing the instructions stored in the non-transitory computer readable medium and should be applied mutatis mutandis to method that may be executed by a computer that reads the instructions stored in the non-transitory computer readable medium.

Bearing this in mind, attention is drawn to FIG. 1, is a schematic illustration of an exemplary evaluation framework for model configuration selection, in accordance with the presently disclosed subject matter.

An evaluation framework for model configuration selection obtains multiple model configurations (the number of model configuration is denoted herein by "K"). The evaluation framework can evaluate multiple models, each model is generated using a corresponding model configuration. The evaluation framework uses unsupervised ML algorithms and synthetic labeling to evaluate the multiple models and to rank them, thereby enabling selection of the corresponding model configuration as best suited for a given task of making detections or predictions. The evaluation framework can evaluate multiple models in an unsupervised way without requiring the availability of labeled training data-sets. The evaluation framework can evaluate the models even when the training data-set in not marked with true labels, denoting normal and/or abnormal states of a physical entity, by utilizing synthetic labeling of the training data-set. These synthetic labels are generated by the evaluation framework itself as further detailed herein.

A model configuration includes a set of parameters utilized to generate the respective model. The model configuration determines the algorithm used to generate the model and its parameters. In some cases, the generation of the corresponding model is based on training data. The model configuration's parameters can include: type of algorithm used to generate the respective models (such as: ANN, random forest, linear regression, etc.), and algorithm parameters (such as: number of layers, depth of tree, etc.). The model is generated based on the model configuration—either by utilizing a different algorithm for each model generated or by using a given algorithm with different parameters for each model generated.

In a non-limiting example, the evaluation framework obtains three model configurations (K=3). The first model configuration has a type of algorithm parameter with the value: "ANN" and an additional parameter of the algorithm of number of layers with the value: "3". The second model configuration also has a type of algorithm parameter with the value: "ANN" and an additional parameter of the algorithm of number of layers with the value: "10". The third model configuration also has a type of algorithm parameter with the value: "ANN" and an additional parameter of the algorithm of number of layers with the value: "100".

The evaluation framework additionally obtains a training data-set comprising a plurality of unlabeled records. In some cases, the training data-set can be normal behavior data 110, wherein at least some of the pluralities of unlabeled records are collections of features describing a given state of one or more physical entities. The physical entity can be, for example, a vehicle, and the records can be obtained by recordings of events occurring within the vehicle, for example by obtaining one or more log files of a computer of the vehicle. The unlabeled records can include features describing normal and abnormal states of the physical entity, but they are not pre-determinedly labeled as such. As the training data-set in unlabeled, the evaluation framework will use synthetic labeling to train the K models to be evaluated. It is noted that in many cases, training data obtained from vehicles include mostly normal behavior data of the vehicle, as most recordings of vehicle runs represent normal behavior of the vehicle.

The training data-set is used by the evaluation framework to evaluate the K models generated utilizing the model configuration. The challenge is that the training data-set in normal behavior data 110 is unlabeled. For this purpose, the evaluation framework can reduce the dimension of the training data-set at step dimension reduction 120. Dimension reduction is the transformation of the training data-set from a high-dimensional space into a low-dimensional space so that the low-dimensional representation of the training data-set retains some meaningful properties of the original training data-set, ideally close to its intrinsic dimension. Working in high-dimensional spaces can be undesirable for a number of reasons; raw data are often sparse as a consequence of the curse of dimensionality, and analyzing the data is many times computationally intractable. Lower dimension representation modelling is preferable as ML based approach (such as: deep learning) represent the training data-set using the multiple features of the training data-set records. After dimension reduction, the reduced dimension training data-set have a smaller number of features. This is useful for the clustering algorithms that are used in the next step, as it is harder to apply clustering on a multiple features space.

It is to be noted that dimension reduction 120 is an optional step and the training data-set can go through clustering at the data clustering 130 step without reducing its dimension. Data clustering is an unsupervised identification of similarities within the training data-set (or optionally, within the reduced dimension training data-set). Data clustering is the task of grouping a set of objects in such a way that objects in the same group (called a cluster) are more similar (in some sense) to each other than to those in other groups (clusters). In our case, data clustering 130 is used on the training data-set (or optionally, on the reduced dimension training data-set) to cluster the unlabeled records into one or more groups (or clusters). Data clustering 130 can be achieved utilizing one or more algorithms, such as: hierarchical clustering, k-means, expectation-maximization, Density Based Spatial Clustering of Applications with Noise (DBSCAN), or other clustering algorithms.

Now that the training data-set has been grouped into clusters, evaluation framework selects one or more of the clusters in step clusters selection 140. This will allow the evaluation framework to synthetically label the training data-set at data labeling 150 step. The records of the training data-sets included within the selected groups are labeled with one label (for example: a synthetic normal label). The records of the training data-sets not included within the selected groups are labeled with another label (for example: a synthetic abnormal label). The candidates' clusters are selected chosen based on their statistical properties (such as: cluster size, within-cluster sum of squares, etc.). In some cases, the selection of the clusters can be random. The evaluation framework can use a given selection to evaluate the K models. It is noted that the evaluation framework can reiterate this step, by choosing a different set of selected clusters and re-evaluate the models again. The final evaluation can depend on the results of one or more of these evaluation rounds.

The labeled training data-set is used to train the K models at the model training 160 step. Each model is generated utilizing a different model configuration and trained based on the synthetically labeled training data-set. Continuing our non-limiting example above, at the model training 160 step, evaluation framework will utilize the 3 model configurations obtained to generate the models and train them on the synthetically labeled training data-set. The three corresponding models that will be generated are: the first model in an ANN model with 3 layers trained on the synthetically labeled training data-set (corresponding to the first model configuration), the second model in an ANN model with 10 layers trained on the synthetically labeled training data-set (corresponding to the second model configuration), and the third model in an ANN model with 100 layers trained on the synthetically labeled training data-set (corresponding to the third model configuration).

The trained models are used by the evaluation framework, at the model inference 170 step, to label the original unlabeled training data-set of the normal behavior data 110. The evaluation framework than scores the trained models, and the corresponding model configuration, by analyzing the labels given by the trained models to the unlabeled training data-set of the normal behavior data 110 at the model evaluation 180 step. The evaluation framework does this by comparing, for each trained model, the corresponding labels it gave to the synthetic labels given to the training data-set at the data labeling 150 step. The closer the labels determined by the trained model are to the synthetic labels, the score for that trained model, and for the corresponding model configuration, is higher. In some cases, the trained model task is anomaly detection.

Model evaluation 180 can be achieved based on analyzing the new labels determined by the trained models for the unlabeled training data-set by using various evaluation methods, such as: Receiver Operating Characteristic-Area Under the Curve (ROC-AUC) curve, precision/recall, F-score or $F_1$-score, etc. The scoring for each of the trained models, and for the corresponding model configuration, is higher for samples that are closer to the synthetic anomalous cluster in one or more predefined metrics (e.g., Euclidean distance, etc.). The data labeling 150, model training 160, model inference 170 and model evaluation 180 steps are re-iterated K times, for each of the trained models. Until a score is determined for each of the K trained models, and their corresponding model configurations.

As noted above, the evaluation framework can reiterate this step, by choosing a different set of selected clusters at the clusters selection 140 step and re-evaluating the model configurations by re-iterating the data labeling 150, model training 160, model inference 170 and model evaluation 180 steps again with the new cluster selection. The final evaluation can depend on the scoring results given to the trained models, and their corresponding model configurations, in the one or more of these evaluation rounds.

Continuing our non-limiting example above, let's assume that the evaluation framework, in the data clustering 130 step, has clustered the unlabeled training data-set into 4 clusters. Let's assume that in the clusters selection 140 step selects clusters 1 and 2. In the data labeling 150 step the evaluation framework labels the records of the unlabeled training data-set associated with clusters 1 and 2 with a normal synthetic label and labels the records of the unlabeled training data-set associated with the remaining clusters (i.e., clusters 3 and 4) with an abnormal synthetic label. At the model training 160 step, the three models are generated utilizing the corresponding model configurations and training using the synthetic labeled training data-set: the first model in an ANN model with 3 layers trained on the synthetically labeled training data-set (corresponding to the first model configuration), the second model in an ANN model with 10 layers trained on the synthetically labeled training data-set (corresponding to the second model configuration), and the third model in an ANN model with 100 layers trained on the synthetically labeled training data-set (corresponding to the third model configuration). The three trained models are used to label the unlabeled training data-set from normal behavior data 110 in the model inference 170 step. The labels determined by the three trained models are evaluated in the model evaluation 180 step to produce a score for each of the trained models and their corresponding model configurations. As noted above, the evaluation framework can reiterate the clusters selection 140 step, by choosing a different set of selected clusters. Let's assume that only cluster 1 is selected at this iteration. The evaluation framework will now label the records of the unlabeled training data-set associated with cluster 1 with a normal synthetic label and labels the records of the unlabeled training data-set associated with the remaining clusters (i.e., clusters 2, 3 and 4) with an abnormal synthetic label. The evaluation framework re-evaluates the model configurations by re-iterating the data labeling 150, model training 160, model inference 170 and model evaluation 180 steps again with the new cluster selection. The final evaluation can depend on the scoring results given to the trained models, and their corresponding model configurations, in the one or more of these evaluation rounds.

Having briefly described an exemplary evaluation framework, attention is drawn to FIG. 2, is a block diagram schematically illustrating one example of a system for model configuration selection, in accordance with the presently disclosed subject matter.

According to certain examples of the presently disclosed subject matter, evaluation framework system 200 (please note that the terms "evaluation framework", "evaluation framework system", "model configuration selection system" and "system" are used herein interchangeably) can comprise a network interface 220 enabling connecting the evaluation framework system 200 to a network and enabling it to send and receive data sent thereto through the network, including in some cases receiving information such as: normal behavior data 110, training data-sets, one or more model configurations, one or more models, selection of one or more clusters, data labels (such as: normal data label and abnormal data label), etc. In some cases, the network interface 220 can be connected to a Local Area Network (LAN), to a Wide Area Network (WAN), to a Controller Area Network bus (CAN-bus), or to the Internet. In some cases, the network interface 220 can connect to a wireless network. It is to be noted that in some cases the information, or part thereof, is transmitted from a physical entity (from example: from a vehicle).

Evaluation framework system 200 can further comprise or be otherwise associated with a data repository 210 (e.g., a database, a storage system, a memory including Read Only Memory—ROM, Random Access Memory—RAM, or any other type of memory, etc.) configured to store data, including, inter alia, normal behavior data 110, training data-sets, one or more model configurations, one or more models, generated utilizing the model configurations, dimension redacted training data-set, clustered training data-set, cluster selection, data labels (such as: normal data label and abnormal data label), scores, etc.

In some cases, data repository 210 can be further configured to enable retrieval and/or update and/or deletion of the data stored thereon. It is to be noted that in some cases, data repository 210 can be distributed. It is to be noted that in some cases, data repository 210 can be stored in on cloud-based storage.

Evaluation framework system 200 further comprises processing circuitry 230. Processing circuitry 230 can be one or more processing circuitry units (e.g., central processing units), microprocessors, microcontrollers (e.g., microcontroller units (MCUs)) or any other computing devices or modules, including multiple and/or parallel and/or distributed processing circuitry units, which are adapted to independently or cooperatively process data for controlling relevant evaluation framework system 200 resources and for enabling operations related to evaluation framework system 200 resources.

The processing circuitry 230 comprises a model configuration selection management module 240, configured to perform a model configuration selection process, as further detailed herein, inter alia with reference to FIG. 3.

Turning to FIG. 3, a flowchart illustrating one example of a sequence of operations carried out for a model configuration selection process, in accordance with the presently disclosed subject matter.

According to certain examples of the presently disclosed subject matter, evaluation framework for model configuration selection system 200 can be configured to perform a model configuration selection process 300, e.g., utilizing the model configuration selection management module 240.

The model configuration selection system 200 obtains multiple model configurations. The evaluation framework can evaluate multiple models, each model is generated using a corresponding model configuration. The evaluation framework uses unsupervised ML algorithms and synthetic labeling to evaluate the multiple models and to rank them, thereby enabling selection of the corresponding model configuration as best suited for a given task of making detections or predictions.

For this purpose, system 200 can be configured to obtain one or more model configurations, each model configuration includes a set of parameters utilized to generate respective models and a training data-set comprising a plurality of unlabeled records, each unlabeled record including a collection of features describing a given state of a physical entity (block 310). The training data-set used can be a static data-set, acquired once from one or more source (like a vehicle). In another cases the training data-set is a time-series based data-set which is continuously acquired from the sources.

It is noted that in some cases the model is an ML model. In other cases, the model is a change point detection model or an anomaly detection model.

After obtaining the model configurations and the training data-set, system 200 can be further configured to cluster the training data-set into two or more training data-set clusters using a clustering algorithm (block 320). The clustering algorithm can be one or more of the following algorithms: DBSCAN, k-means, constrained k-means, or any other clustering algorithm. The training data-set clusters are distinct.

In some cases, the processing circuitry 230 is further configured to reduce a dimension of the training data-set before clustering the training data-set into two or more training data-set clusters. In these cases, the selection of the subset of clusters, and the rest of the process described herein, is done on the reduced dimension training data-set.

After clustering the training data-set, evaluation framework system 200 is further configured to label the unlabeled records of a subset of the training data-set clusters with a synthetic normal label, giving rise to a normal training data-set, and label the unlabeled records of the training data-set clusters not included in the subset with a synthetic abnormal label (block 330). In some cases, the selection of the subset of the training data-set clusters can be made based on the properties of the clusters. In other cases, the selection of the subset of the training data-set clusters can be made randomly.

Evaluation framework system 200 can now be configured to train, for each model configuration, using the normal training data-set, a corresponding model utilizing the corresponding set of parameters, each model capable of receiving the unlabeled records, and determining, for each of the unlabeled records, a corresponding normal label or abnormal label, wherein the normal label being indicative of conformity of the respective unlabeled record with an allowed state of the physical entity and the abnormal label being indicative of conformity of the respective unlabeled record with a disallowed state of the physical entity (block 340).

After training the corresponding model, evaluation framework system 200 is further configured to determine, for each model, a score, associated with an ability of the corresponding model to determine labels to the unlabeled records of the training data-set in accordance with the synthetic normal labels and with the synthetic abnormal labels (block 350).

In the cases that the model is a change point detection model, it is used to sequentially concatenate a series of data points from the different clusters selected in the clusters selection and evaluate the change point detection model by the detection of a distance from a change point.

After determining the scores, evaluation framework system 200 is further configured to perform an action, based on the scores (block 360). The action is one or more of the following actions: determining, for each of the model configurations, if a first overall score calculated for a corresponding model configuration, based on the scores of the respective model is above a first threshold. ranking the model configurations based on the scores of the corresponding models. Changing the model configuration automatically, upon a second overall score calculated for a corresponding model configuration, based on the scores of the respective model is a below a second threshold. The change to the model configuration of the respective model is made by changing at least one parameter of the set of parameters, and then repeating the steps in blocks 340-360 until the second overall score is equal or above the second threshold.

In addition, system 200 can be further used as an Explainable AI (XAI) solution. In this case, the models in which their results cannot be understood by humans are explained. For this purpose, processing circuitry 230 can be further configured to label, each of the training data-set clusters with a synthetic unique cluster label, giving raise to uniquely labeled training data-set clusters. train, utilizing the uniquely labeled training data-set clusters, a classifier model, capable of receiving the unlabeled records, and determining, for each of the unlabeled records, a corresponding synthetic unique cluster label. Determine, for each model, an explainability score, associated with a similarity between a first explanation of a first output of the model on the unlabeled records of the training data-set and a second explanation of a second output of the classifier model on the unlabeled records of the training data-set. The score of each model in block 360 can be based also on the corresponding explainability score.

It is to be noted, that the model configuration selection process 300 described herein can be based on available normal data alone. System 200 adds synthetic labels to the training data-set to allow the training of the models. In addition, the clustering and the partitioning of the training data-set are based on latent space for the sample labeling.

The model configuration selection process 300 described herein can be utilized for the evaluation of various unsupervised problems: anomaly scoring, anomaly detection, changepoint detection and explainability.

It is to be noted that, with reference to FIG. 3, some of the blocks can be integrated into a consolidated block or can be broken down to a few blocks and/or other blocks may be added. Furthermore, in some cases, the blocks can be performed in a different order than described herein. It is to be further noted that some of the blocks are optional (for example, block 360 can be an optional block). It should be also noted that whilst the flow diagram is described also with reference to the system elements that realizes them, this is by no means binding, and the blocks can be performed by elements other than those described herein.

It is to be understood that the presently disclosed subject matter is not limited in its application to the details set forth in the description contained herein or illustrated in the drawings. The presently disclosed subject matter is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the present presently disclosed subject matter.

It will also be understood that the system according to the presently disclosed subject matter can be implemented, at least partly, as a suitably programmed computer. Likewise, the presently disclosed subject matter contemplates a computer program being readable by a computer for executing the disclosed method. The presently disclosed subject matter further contemplates a machine-readable memory tangibly embodying a program of instructions executable by the machine for executing the disclosed method.

The invention claimed is:

1. A model configuration selection system, the model configuration selection system comprising a processing circuitry configured to:
   (A) obtain: (a) one or more model configurations, each model configuration includes a set of parameters utilized to generate respective models, and (b) a training data-set comprising a plurality of unlabeled records, each unlabeled record including a collection of features describing a given state of a physical entity;
   (B) cluster the training data-set into two or more training data-set clusters using a clustering algorithm;
   (C) label (a) the unlabeled records of a subset of the training data-set clusters with a synthetic normal label, giving rise to a normal training data-set, and (b) the unlabeled records of the training data-set clusters not included in the subset with a synthetic abnormal label, wherein the subset of the training data-set clusters is selected from the training data-set clusters randomly;
   (D) train, for each model configuration, using the normal training data-set, a corresponding model utilizing the corresponding set of parameters, each model capable of receiving the unlabeled records, and determining, for each of the unlabeled records, a corresponding normal label or abnormal label, wherein the normal label being indicative of conformity of the respective unlabeled record with an allowed state of the physical entity and the abnormal label being indicative of conformity of the respective unlabeled record with a disallowed state of the physical entity;
   (E) determine, for each model, a score, associated with an ability of the corresponding model to determine labels to the unlabeled records of the training data-set in accordance with the synthetic normal labels and with the synthetic abnormal labels; and
   (F) perform an action, based on the scores, wherein the action includes, upon calculating a second overall score for a respective model configuration of a given model of the models, changing the respective model configuration of the given model by changing at least one parameter of the set of parameters, based on the score determined for the given model being below a second threshold, and repeating steps (D) to (F) until the second overall score is equal or above the second threshold.

2. The model configuration selection system of claim 1, wherein the action also includes one or more of:
   (a) determining, for each of the model configurations and based on the scores of the respective models, if a first overall score calculated for a corresponding model configuration is above a first threshold, or
   (b) ranking the model configurations based on the scores of the corresponding models.

3. The model configuration selection system of claim 1, wherein the processing circuitry is further configured to reduce a dimension of the training data-set before clustering the training data-set into two or more training data-set clusters.

4. The model configuration selection system of claim 1, wherein the processing circuitry is further configured to:
   label each of the training data-set clusters with a synthetic unique cluster label, giving raise to uniquely labeled training data-set clusters;
   train utilizing the uniquely labeled training data-set clusters, a classifier model, capable of receiving the unlabeled records, and determining, for each of the unlabeled records, a corresponding synthetic unique cluster label;
   determine, for each model, an explainability score, associated with a similarity between a first explanation of a first output of the model on the unlabeled records of the training data-set and a second explanation of a second output of the classifier model on the unlabeled records of the training data-set; and
   wherein the score of each model is based also on the corresponding explainability score.

5. The model configuration selection system of claim 1, wherein the clustering algorithm is one or more of the following: dbscan, k-means, or constrained k-means.

6. The model configuration selection system of claim 1, wherein the model is one of: a change point detection model, or an anomaly detection model.

7. The model configuration selection system of claim 1, wherein the training data-set is one or more of: a static data-set, or a time-series data-set.

8. The model configuration selection system of claim 1, wherein the model configuration selection system is an unsupervised model configuration selection system.

9. The system of claim 1, wherein the physical entity is a vehicle.

10. A method comprising:
    (A) obtaining, by a processing circuitry: (a) one or more model configurations, each model configuration includes a set of parameters utilized to generate respective models, and (b) a training data-set comprising a plurality of unlabeled records, each unlabeled record including a collection of features describing a given state of a physical entity;
    (B) clustering, by the processing circuitry, the training data-set into two or more training data-set clusters using a clustering algorithm;
    (C) labeling, by the processing circuitry, (a) the unlabeled records of a subset of the training data-set clusters with a synthetic normal label, giving rise to a normal training data-set, and (b) the unlabeled records of the training data-set clusters not included in the subset with a synthetic abnormal label, wherein the subset of the training data-set clusters is selected from the training data-set clusters randomly;
    (D) training, by the processing circuitry, for each model configuration, using the normal training data-set, a corresponding model utilizing the corresponding set of parameters, each model capable of receiving the unlabeled records, and determining, for each of the unlabeled records, a corresponding normal label or abnormal label, wherein the normal label being indicative of conformity of the respective unlabeled record with an allowed state of the physical entity and the abnormal label being indicative of conformity of the respective unlabeled record with a disallowed state of the physical entity;
    (E) determining, by the processing circuitry, for each model, a score, associated with an ability of the corresponding model to determine labels to the unlabeled records of the training data-set in accordance with the synthetic normal labels and with the synthetic abnormal labels; and (F) performing, by the processing circuitry, an action, based on the scores, wherein the action includes, upon calculating a second overall score for a respective model configuration of a given model of the models, changing the respective model configuration of the given model by changing at least one parameter of the set of parameters, based on the score determined for the given model being below a second threshold, and repeating steps (D) to (F) until the second overall score is equal or above the second threshold.

11. The method of claim 10, wherein the action also includes one or more of:
   (a) determining, for each of the model configurations and based on the scores of the respective models, if a first overall score calculated for a corresponding model configuration is above a first threshold, or
   (b) ranking the model configurations based on the scores of the corresponding models.

12. The method of claim 10, further comprising: reducing, by the processing circuitry, a dimension of the training data-set before clustering the training data-set into two or more training data-set clusters.

13. The method of claim 10, further comprising:
   labeling, by the processing circuitry, each of the training data-set clusters with a synthetic unique cluster label, giving raise to uniquely labeled training data-set clusters;
   training, by the processing circuitry, utilizing the uniquely labeled training data-set clusters, a classifier model, capable of receiving the unlabeled records, and determining, for each of the unlabeled records, a corresponding synthetic unique cluster label;
   determining, by the processing circuitry, for each model, an explainability score, associated with a similarity between a first explanation of a first output of the model on the unlabeled records of the training data-set and a second explanation of a second output of the classifier model on the unlabeled records of the training data-set; and
   wherein the score of each model is based also on the corresponding explainability score.

14. The method of claim 10, wherein the clustering algorithm is one or more of the following: dbscan, k-means, or constrained k-means.

15. The method of claim 10, wherein the model is one of: a change point detection model, or an anomaly detection model.

16. The method of claim 10, wherein the model configuration selection system is an unsupervised model configuration selection system.

17. The method of claim 10, wherein the physical entity is a vehicle.

18. A non-transitory computer readable storage medium having computer readable program code embodied therewith, the computer readable program code, executable by processing circuitry of a computer to perform a method comprising:
   (A) obtaining, by a processing circuitry: (a) one or more model configurations, each model configuration includes a set of parameters utilized to generate respective models, and (b) a training data-set comprising a plurality of unlabeled records, each unlabeled record including a collection of features describing a given state of a physical entity;
   (B) clustering, by the processing circuitry, the training data-set into two or more training data-set clusters using a clustering algorithm;
   (C) labeling, by the processing circuitry, (a) the unlabeled records of a subset of the training data-set clusters with a synthetic normal label, giving rise to a normal training data-set, and (b) the unlabeled records of the training data-set clusters not included in the subset with a synthetic abnormal label, wherein the subset of the training data-set clusters is selected from the training data-set clusters randomly;
   (D) training, by the processing circuitry, for each model configuration, using the normal training data-set, a corresponding model utilizing the corresponding set of parameters, each model capable of receiving the unlabeled records, and determining, for each of the unlabeled records, a corresponding normal label or abnormal label, wherein the normal label being indicative of conformity of the respective unlabeled record with an allowed state of the physical entity and the abnormal label being indicative of conformity of the respective unlabeled record with a disallowed state of the physical entity;
   (E) determining, by the processing circuitry, for each model, a score, associated with an ability of the corresponding model to determine labels to the unlabeled records of the training data-set in accordance with the synthetic normal labels and with the synthetic abnormal labels; and
   (F) performing, by the processing circuitry, an action, based on the scores, wherein the action includes, upon calculating a second overall score for a respective model configuration of a given model of the models, changing the respective model configuration of the given model by changing at least one parameter of the set of parameters, based on the score determined for the given model being below a second threshold, and repeating steps (D) to (F) until the second overall score is equal or above the second threshold.

* * * * *